(12) United States Patent
Pinson et al.

(10) Patent No.: US 11,628,404 B2
(45) Date of Patent: Apr. 18, 2023

(54) MONOLITHIC MEMBRANE FILTRATION STRUCTURE

(71) Applicant: SAINT-GOBAIN CENTRE DE RECHERCHES ET D'ETUDES EUROPEEN, Courbevoie (FR)

(72) Inventors: Sébastien Pinson, Cavaillon (FR); Paul Leplay, Robion (FR); Malte Moeller, Roedental (DE); Ronald Neufert, Michelau (DE); Michael Faber, Neustadt (DE)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 149 days.

(21) Appl. No.: 16/767,422

(22) PCT Filed: Nov. 29, 2018

(86) PCT No.: PCT/FR2018/053044
§ 371 (c)(1),
(2) Date: May 27, 2020

(87) PCT Pub. No.: WO2019/106306
PCT Pub. Date: Jun. 6, 2019

(65) Prior Publication Data
US 2020/0384419 A1 Dec. 10, 2020

(30) Foreign Application Priority Data
Nov. 30, 2017 (FR) ...................................... 1761432

(51) Int. Cl.
*B01D 63/06* (2006.01)
*B01D 71/02* (2006.01)

(52) U.S. Cl.
CPC ............ *B01D 63/066* (2013.01); *B01D 71/02* (2013.01); *B01D 2221/04* (2013.01); *B01D 2221/06* (2013.01); *B01D 2221/10* (2013.01)

(58) Field of Classification Search
CPC .. B01D 63/066; B01D 71/02; B01D 2221/04; B01D 2221/06; B01D 2221/10
See application file for complete search history.

(56) References Cited

U.S. PATENT DOCUMENTS 4,069,157 A 1/1978 Hoover et al.
4,781,831 A 11/1988 Goldsmith
(Continued)

FOREIGN PATENT DOCUMENTS

EP 1 457 243 A1 9/2004
EP 1 607 129 A1 12/2005
(Continued)

OTHER PUBLICATIONS

International Search Report as issued in International Patent Application No. PCT/FR2018/053044, dated Apr. 2, 2019.

*Primary Examiner* — Benjamin L Lebron
(74) *Attorney, Agent, or Firm* — Pillsbury Winthrop Shaw Pittman LLP

(57) ABSTRACT

A monolithic membrane-type filtration structure for filtering liquids, includes a support formed of a porous inorganic material of permeability $K_s$, the support having a tubular overall shape with a main axis, an upstream base, a downstream base, a peripheral wall delimiting an internal part and a plurality of passages parallel to the main axis of the support, formed in the internal part of the support, a membrane of permeability $K_m$ and of mean thickness $t_m$ covering the internal surface of the passages; the external hydraulic diameter of the structure satisfying the relationship $\emptyset_f = \alpha \times [A + B \times \log_{10}(K_s \times t_m / K_m)]$; in which $\alpha$ is a coefficient between 0.85 and 1.15, and $A = -21570 \times ent_{int}^2 - 18.6 \times D_h +$ (Continued)

$19.0 \times e_{int} - 2.5 \times e_{ext} + 0.1244$  $B = -11760 \times D_h \times e_{int} + 9.7 \times e_{int} + 3.1 \times e_{ext} + 0.04517$. $D_h$ is the mean hydraulic diameter of the passages, $e_{int}$ is the minimum thickness of the internal walls between the passages, $e_{ext}$ is the minimum thickness of the peripheral wall of the filter.

17 Claims, 4 Drawing Sheets

(56) References Cited

U.S. PATENT DOCUMENTS

| | | |
|---|---|---|
| 5,855,781 A | 1/1999 | Yorita et al. |
| 6,077,436 A | 6/2000 | Rajnik et al. |
| 2001/0020756 A1 | 9/2001 | Hidaka et al. |
| 2006/0090651 A1* | 5/2006 | Liu .................. C01B 3/503 |
| | | 96/121 |
| 2017/0182468 A1* | 6/2017 | Rodrigues ......... B01D 46/0002 |
| 2017/0348641 A1* | 12/2017 | Rodrigues ......... B01D 67/0046 |

FOREIGN PATENT DOCUMENTS

| | | |
|---|---|---|
| WO | WO 2015/177476 A1 | 11/2015 |
| WO | WO 2016/097661 A1 | 6/2016 |
| WO | WO 2017/085551 A1 | 5/2017 |
| WO | WO 2017/103473 A1 | 6/2017 |

* cited by examiner

MONOLITHIC MEMBRANE FILTRATION STRUCTURE

CROSS-REFERENCE TO RELATED APPLICATIONS

This application is the U.S. National Stage of PCT/FR2018/053044, filed Nov. 29, 2018, which in turn claims priority to French patent application number 1761432 filed Nov. 30, 2017. The content of these applications are incorporated herein by reference in their entireties.

The invention relates to the field of filter structures made of inorganic material and intended to filter liquids, particularly porous structures coated with a membrane for separating particles or molecules from a liquid, more particularly from water, in particular from the production water derived from the extraction of petroleum or gases from shale.

It also finds an application in various industrial processes for the purification and/or separation of liquids in the chemical, pharmaceutical, foodstuffs or agrifoodstuffs industries.

Filters employing ceramic, or otherwise, membranes to filter varied fluids, in particular contaminated waters, have long been known.

The filters are generally produced from tubular supports made of a porous inorganic material formed of walls delimiting longitudinal passages parallel to the axis of said supports. The internal surface of the passages is covered with a separating membrane.

This membrane comprises a material, usually inorganic, the nature and morphology of which are suited to holding back the contaminating molecules or particles, insofar as their size is of the order of the median diameter of the pores of said membrane.

A first technique, known as frontal filtration, that involves passing the fluid that is to be treated through a filter medium, perpendicular to its surface, is known. Frontal filters typically comprise a portion of the passages which are plugged on their front face and a portion of the passages which are plugged on their rear face, so as to form inlet passages and outlet passages which are separated by filter walls through which the liquid that is to be filtered has to pass. This liquid as it passes becomes unloaded of its molecules or particles across the walls and the membrane, thus forming the retentate which then accumulates in the inlet passages whereas the purified liquid escapes via the outlet passages or even in part via the periphery of the filter if this periphery is free. This technique is limited by the buildup of particles and the formation of a cake at the surface of the filter medium. Usually, the inlet passages are open to the passage of the liquid that is to be filtered on the upstream face (or front) of the filter, with reference to the direction in which the liquid to be filtered circulates. These inlet passages may be plugged on the downstream face (or opposite face) of said filter in the direction of circulation of the liquid. The outlet passages or passages via which the filtered liquid is removed may on the other hand be plugged on the upstream face of the filter and open on the downstream face of the filter.

According to another technique to which the present invention likewise relates, use is made of tangential filtration which, on the other hand, makes it possible to limit the buildup of particles thanks to the longitudinal circulation of the fluid at the surface of the membrane. The particles remain in the circulating flow whereas the liquid can pass through the membrane under the effect of a pressure difference. This technique ensures stability in the performance and level of filtration. It is more particularly recommended for filtering fluids that are very heavily laden with particles and/or with molecules.

The strong points of tangential filtration are, therefore, its ease of implementation, its reliability thanks to the use of the membranes the porosity of which is adapted to performing said filtration, and its continuous operation.

Tangential filtration calls upon little or no adjuvant and supplies two separate fluids both of which can be put to profitable use: the concentrate (also referred to as the retentate) and the filtrate (also referred to as the permeate): it is a clean method which is respectful of the environment.

The filtration principles and efficiency of such filters rely on the application of a pressure difference within the structure so as to allow the fluid to pass across the porous walls. The flow resistance of the liquid does, however, limit the flow of filtrate obtained.

Various geometries have been proposed in order to improve the service properties of such membrane filters. U.S. Pat. No. 4,069,157 for example discloses a multipassage structure of which the surface area, passage density and porosity of the support are optimized in order to increase the flow while at the same time minimizing the size (i.e. the diameter) of the filter. In order to reduce the flow resistance of the filter, it has been proposed that slots or discharge passages be provided with different geometries (U.S. Pat. Nos. 4,781,831, 5,855,781, 6,077,436, EP 1457243, EP 1607129). The slots may be created by machining on the filter after curing or during extrusion, as proposed more particularly by US 2001/0020756.

The problem of flow resistance caused by the passage of the fluids through the porous walls arises in particular in the case of tangential filters of large diameter for which the liquid passing through the most central passages is filtered far less effectively than the liquid passing through the most peripheral passages of the filter.

In order to alleviate this problem, patent application WO2017/103473 describes a structure in which discharge slots are made as far as the center of the structure and certain passages are plugged so that the permeate coming from the central part of the filter can be more easily collected toward the periphery of the filter. The filter according to that publication, unlike in the present invention, requires some of the through-passages to be plugged at both their upstream and downstream ends in order to obtain removal passages for collecting the fluid and extracting it via slots made laterally on the filter (see FIG. 1).

Also known, from application WO2017/085551A1, is a filtration device produced from the assembly of several monolithic ceramic honeycomb filter elements, preferably arranged substantially parallel, each element comprising a plurality of parallel ducts. Such a construction makes it possible to limit the individual size of the filtration structures used and thus guarantee maximum filtration effectiveness within each unit. With such a construction, it is possible to obtain large-sized filters without resorting to machining and ultimately to increase the peripheral surface area via which the permeate is removed. However, such a construction poses a number of drawbacks: first of all, this device has the effect of requiring an increased number of seals and of increasing the risk of leaks or of passage of the liquid that is to be filtered through the permeate. Furthermore, compared with a monolithic filter structure of the same size (or total volume), such a solution relying on assembling a plurality of small individual filtration structures generates a significant loss in overall filtration volume of the filter because of the space needed between each of said units. In addition, the cost of the assembled filter or multi-filter-element solution proves to be markedly higher than that of a monolithic filter.

Applications WO2015/177476 and WO2016/097661 describe tangential filters of tubular shape comprising elements delimiting a collection of parallel passages at least some of which are covered with a separating layer. According to the data supplied in these publications, the applicant company has been able to determine that the diameters of the elements described in these publications were not, however, optimal for obtaining the best performance of the filter ultimately obtained, as reported in the examples which follow.

There is at the present time therefore a need for a monolithic filter structure comprising a membrane for the tangential filtration of liquid, which means to say a filter structure comprising a single porous support on the walls of which a filter membrane is applied, that has maximum filtration effectiveness, which is to say that has an optimized and maximized flow of the filtrate, for the same size and for the same essential features of the wall of the support and of the membrane.

What is meant by a monolithic structure is a structure made up of a single porous support allowing all of the liquid that is to be filtered to be processed within one filter. By contrast, a non-monolithic or multi-element filter may be made up of a plurality comprising a plurality of supports, each support thus constituting an individual filter structure, the filtration of the liquid being performed partly by each of the units. Application WO2017/085551 describes such a multi-element filter.

In particular, the applicant company has discovered that optimizing the filtrate flow in this way relies on a combined adaptation of the various elements that make up the monolithic filter structure. In other words, it has been discovered that the physical characteristics of the support and the physical characteristics of the membrane need to be adjusted together with one another in order to obtain maximum filtration effectiveness.

Unlike the preceding solutions which propose various configurations that take only the geometric characteristics of the filters into consideration, the present invention therefore relies on the principle of establishing a correlation between said geometric characteristics and certain essential features of the membrane in order to determine the optimum configuration for the filter structure. Such a correlation has hitherto never yet been described.

Thus, the inventors discovered that it was possible, for an equivalent size, to maximize the flow of filtered permeate of a monolithic structure or tangential filter mono-element by comparison with multi-element structures, namely structures comprising several of the filter elements.

More particularly, the inventors discovered that there is an optimum diameter of the monolithic filter structure that can be determined by taking into consideration the geometric and physical characteristics of the support and of the membrane below which the monolithic solution performs better than a multi-element solution. It is thus possible, by applying the present invention, to select a domain in which the monolithic filter structure will be the optimum solution in terms of flow while at the same time remaining less complex and less expensive to implement than a filter obtained from assembling a plurality of elements.

More specifically, the present invention relates to a monolithic membrane-type filtration structure for tangentially filtering liquids, comprising:

a support formed of a porous inorganic material of permeability $K_s$, said support having a tubular overall shape with a main axis, an upstream base, a downstream base, a peripheral wall delimiting an internal part;

a plurality of passages parallel to the main axis of the support, formed in the internal part of the support, said passages being separated from one another by internal walls formed of the porous inorganic material;

said passages being open at their upstream or downstream ends, advantageously open at both their upstream and downstream ends, in the direction in which said liquid circulates, the filtered liquid being removed via said peripheral wall, a membrane of permeability $K_m$ and of mean thickness $t_m$ covering the internal surface of the passages;

characterized in that the external hydraulic diameter $\varnothing_f$ of said filter structure satisfies the relationship (1):

$$\varnothing_f \alpha \times [A + B \times \log_{10}(K_s \times t_m / K_m)] \tag{1}$$

in which $\alpha$ is a coefficient comprised between 0.85 and 1.15, and $$A = -21570 \times e_{int}^2 - 18.6 \times D_h + 19.0 \times e_{int} - 2.5 \times e_{ext} + 0.1244$$

$$B = -11760 \times D_h \times e_{int} + 9.7 \times e_{int} + 3.1 \times e_{ext} + 0.04517$$

in which:

$D_h$ is the mean hydraulic diameter of the passages, $e_{int}$ is the minimum thickness of the internal walls between the passages, $e_{ext}$ is the minimum thickness of the peripheral wall of the filter, $t_m$, $\varnothing_f$, $e_{int}$, $e_{ext}$ and $D_h$ being expressed in meters and $K_s$ and $K_m$ being expressed in m².

In the above formula, the following definitions are given:

The hydraulic diameter $\varnothing f$ of the support is calculated, in any transverse plane of section P of the tubular structure, from the surface area of the cross section of said support Sf and the perimeter Pf thereof, in said plane of section and by applying the following conventional expression:

$$\varnothing f = 4 \times Sf / Pf$$

The hydraulic diameter $D_h$ of a passage is calculated, in any transverse plane of section P of the tubular structure, from the surface area of the cross section of the passage Sc of said passage and the perimeter Pc thereof, in said plane of section, and by applying the following conventional expression:

$$D_h = 4 \times Sc / Pc$$

The minimum thickness $e_{ext}$ of the peripheral wall is measured between the external perimeter of the peripheral wall and the edge of the closest passage, in any transverse plane of section P of the tubular structure, as reported in FIG. 1.

The minimum thickness $e_{int}$ is the shortest distance measured between the edge of two passages that share a common wall in any transverse plane of section P of the tubular structure, as reported in FIG. 1.

According to preferred embodiments of the present invention, which may be combined with one another where appropriate:

the ratio $K_s \times t_m / K_m$ is comprised between 0.01 m and 10 m.

the external hydraulic diameter $\varnothing_f$ of the support is comprised between 30 and 100 mm, preferably greater than 40 mm, or even greater than 50 mm and less than 80 mm.

the mean hydraulic diameter of the passages $D_h$, in a plane P perpendicular to the main axis of the filter structure, is comprised between 0.5 and 7 mm, preferably between 1 and 5 mm, and more preferably, between 1.5 and 4 mm, and very preferably, between 1.5 and 3.5 mm.

α is comprised between 0.90 and 1.10 and more preferably still, α is comprised between 0.95 and 1.05.

the minimum thickness of the internal walls $e_{int}$ of the internal walls of the support is comprised between 0.3 mm and 3 mm, preferably between 0.7 mm and 2 mm.

the support has square, hexagonal or circular bases, preferably circular bases.

the structure has a length of 200 to 1500 mm, more preferably still, comprised between 500 and 1100 mm.

all the passages have the same hydraulic diameter.

at least two passages have a different hydraulic diameter.

the minimum thickness $e_{ext}$ of the peripheral wall is comprised between 0.5 and 4 mm, preferably between 1 and 2 mm.

the permeability Ks of the material constituting the support is preferably comprised between $1.0 \times 10^{-14}$ and $1.0 \times 10^{-11}$, preferably between $1.0 \times 10^{-13}$ and $1.0 \times 10^{-11}$.

the permeability Km of the membrane is preferably comprised between $1.0 \times 10^{-19}$ and $1.0 \times 10^{-14}$, preferably between $1.0 \times 10^{-17}$ and $1.0 \times 10^{-15}$.

the mean thickness of the membrane $t_m$ is comprised between 0.1 and 300 μm, preferably between 10 and 70 μm.

the membrane has a median pore diameter comprised between 50 and 1500 nanometers, preferably between 100 and 1000 nanometers.

the membrane has an open porosity comprised between 10 and 70%, preferably between 30 and 50%.

the median diameter of the pores of the support is comprised between 5 and 50 micrometers, preferably between 15 and 40 micrometers and very preferably, between 20 and 30 micrometers.

the porosity of the support is comprised between 20 and 60%, and more preferably still is greater than that of the membrane by at least 10%.

the passages are of circular or polygonal cross section, particularly of square, hexagonal or octagonal and square cross section.

The invention also relates to a filtration device comprising:
said filter structure
an enclosure sealing around said filter structure, said enclosure comprising:
  means for introducing the liquid that is to be filtered, in fluidic communication with the passages on the upstream face of said filter structure,
  means for removing the permeate at the periphery of the filter structure and in fluidic communication with the peripheral wall of said filter structure,
  means for removing the retentate or concentrate on the downstream face of said filter structure.

According to the invention, several filtration devices as described hereinabove may in particular be used in series and/or in parallel.

Furthermore, the invention relates to the use of a filter structure as defined hereinabove for purifying and/or separating liquids in the chemical, pharmaceutical, food or agrifoodstuffs industry, in bioreactors, or in the extraction of oil or gases from shale.

Finally, the present invention describes a method that makes it possible to optimize the size of monolithic filter structures. In a way not yet hitherto described, the present method proposes taking account not only of the intrinsic parameters of the filtration support but also of certain intrinsic parameters of the filter membrane applied to the walls of the support.

In relationship (1) the magnitudes are expressed in the conventional way in the units of the SI system, namely in meters (m) in the case of the magnitudes $t_m$, $\emptyset_f$, $p_c$, $p_f$, $e_{int}$, $e_{ext}$ and $D_h$, or alternatively in square meters (m$^2$) in the case of the magnitudes $K_s$ and $K_m$, $S_f$ and $S_c$.

The permeability of the support $K_s$ and of the membrane $K_m$ are defined on the basis of the Kozeny-Carman relationship by the following formula: $K=(PO^3 \times D_{50}^2)/[180 \times (1-PO)^2]$ in which PO is the open porosity and $D_{50}$ is the median diameter of the pores.

The open porosity and the median diameter of the pores of the support according to the present invention are determined in the known way by mercury porosimetry. The porosity, corresponding to the pore volume, is measured by mercury intrusion at 2000 bar using a mercury porosimeter such as the Autopore IV series 9500 porosimeter by Micromeritics, on a 1 cm$^3$ test specimen taken from a block of the support, the sample region excluding the skin which typically extends down to 500 microns beneath the surface of the block. The relevant standard is ISO 15901-1.2005 part 1. Increasing the pressure to a high pressure causes the mercury to be "pushed" into pores of increasingly small size. The intrusion of the mercury conventionally takes place in two phases. In a first phase, mercury intrusion is performed at a low pressure up to 44 psia (around 3 bar), using air pressure to introduce the mercury into the largest pores (>4 μm). In a second phase, high-pressure intrusion is performed using oil up to the maximum pressure of 30000 psia (around 2000 bar). According to the Washburn law mentioned in standard ISO 15901-1.2005 part 1, a mercury porosimeter thus makes it possible to establish a distribution of pore sizes by volume. The median pore diameter of the support corresponds to the threshold of 50% of the population by volume.

The porosity of the membrane, which corresponds to the total volume of the pores in the membrane, and the median pore diameter of the membrane are advantageously determined according to the invention using a scanning electron microscope. In the context of the present invention, the porosity obtained for the membrane using this method is considered to be likenable to the open porosity. Typically, sections of a wall of the support are taken in cross section so as to look at the entire thickness of the coating over a cumulative length of at least 1.5 cm. Image acquisition is performed on a specimen of at least 50 grains, preferably at least 100 grains. The surface area and equivalent diameter of each of the pores are obtained from shots by conventional image analysis techniques, possibly after the image has been binarized with a view to increasing its contrast. A distribution of equivalent diameters is thus deduced and from this the median pore diameter is extracted. The porosity of the membrane is obtained by integrating the equivalent pore diameter distribution curve. Likewise, this method can be used to determine a median size for the particles that make up the membrane layer. One example of the determining of the median pore diameter or of the median size of the particles that make up the membrane layer, by way of illustration, comprises the succession of the following steps, which is conventional in the field:

A series of SEM shots is taken of the support with its membrane layer as observed in cross section (which means to say through the entire thickness of a wall). For greater sharpness, the shots are taken on a polished section of the material. Image acquisition is performed over a cumulative length of membrane layer at least equal to 1.5 cm, in order to obtain values representative of the entire sample.

The shots are preferably subjected to binarization techniques well known in image processing techniques in order to increase the contrast of the outline of the particles or of the pores.

For each particle or each pore that makes up the membrane layer, its area is measured. An equivalent pore diameter or grain diameter is determined, this corresponding to the diameter of a prefect disk of the same surface area as that measured for said particle or for said pore (this operation potentially being able to be carried out using dedicated software, in particular Visilog® marketed by Noesis). A particle-size or grain-size or pore-diameter distribution is thus obtained according to a conventional curve giving a distribution by number and a median size of the particles and/or a median diameter of pores that make up the membrane layer are thus determined, this median size or this median diameter respectively corresponding to the equivalent diameter that divides said distribution into a first population containing only particles or pores of equivalent diameter above or equal to this median size and a second population containing only particles of an equivalent diameter below this median size or this median diameter.

The shape of the support defines the overall shape of the filter structure and its size, give or take the seals, as indicated in FIG. 2 (seal 17). It has a tubular shape elongate along a main axis and comprises an upstream base, a downstream base, a peripheral surface and an internal portion. The upstream and downstream bases, of identical shapes and sizes, may be varied in shape, for example square, hexagonal or circular. They are preferably circular. The downstream face (or base) is intended to be positioned facing the incoming flow of liquid (liquid to be filtered) and the upstream face (or base) is intended to be positioned on the opposite side to the incoming flow of liquid.

A plurality of passages parallel to the main axis of the support is formed in the internal portion of the support. These passages, also referred to as filter passages, are open at both ends in the direction of flow of the fluids.

The shape of the passages is not limited and these may have a polygonal, in particular hexagonal or square or octagonal/square or alternatively circular, cross section but preferably have a circular or square cross section. The mean hydraulic diameter of the passages $D_h$ is described hereinabove. The filter may contain several categories of passages, apart from the peripheral passages which may be truncated in order to adapt the dimensions of the filter. A category of passages is defined by a collection of passages that have the same shape and the same hydraulic diameter, to within +/−5%. For preference, the non-peripheral passages are round and of the same category. For example, the filter may comprise a first category of passages made up of passages situated near the peripheral surface of the filter, and a second category made up of passages situated at the center of the filter, the passages of the first category having a hydraulic diameter higher than those of the second category. However, for preference, the filter comprises just one single category of passages.

The passages are separated from one another by internal walls formed by the porous inorganic material of the support. The mean thickness of the internal walls is typically from 0.3 to 3 mm, preferably between 0.7 and 2 mm, or even between 0.4 to 1.4 mm.

For example, the mean thickness of the peripheral wall is comprised between 1 and 5 mm, preferably between 1.5 and 3 mm.

The support is made from a porous inorganic material, in particular a non-oxide ceramic material such as SiC, particularly recrystallized SiC, $Si_3N_4$, $Si_2ON_2$, SiAlON, BN or a combination of these. Its porosity is typically from 20 to 70%, preferably from 40 to 50%, and the median pore diameter from 5 nm to 50 micrometers, preferably from 100 nm to 40 micrometers, more preferably from 5 to 30 micrometers, preferably between 20 and 40 micrometers. The permeability of the support $K_s$ is preferably comprised between $1.0×10^{-14}$ and $1.0×10^{-11}$, preferably between $1.0×10^{-13}$ and $1.0×10^{-12}$ m².

The monolithic filter structure according to the invention also comprises a membrane covering the internal surface of the passages. It is formed of a porous inorganic material, in particular a non-oxide ceramic material such as SiC, particularly recrystallized SiC, $Si_3N_4$, $Si_2ON_2$, SiAlON, BN or a combination of these. Its porosity is typically from 10 to 70% and the median pore diameter from 10 nm to 5 µm. The permeability of the membrane $K_m$ is preferably from $10^{-19}$ to $10^{-14}$ m², preferably between $1.0×10^{-17}$ and $1.0×10^{-16}$ m². It typically has a mean thickness $t_m$ from 0.1 to 300 µm, preferably from 1 to 200 µm, more preferably from 10 to 70 µm.

The filter structure according to the invention may be obtained by any technique well known to those skilled in the art. A conventional manufacturing process generally comprises the main steps of manufacturing the support and then of depositing the membrane.

The support is preferably obtained by extruding a paste through a die followed by a drying and a firing in order to sinter the material of the support and obtain the porosity and mechanical strength characteristics needed for the application. For example, in the case of a support made of recrystallized SiC, it may in particular be obtained according to the following manufacturing steps:

kneading a mixture containing particles of silicon carbide of a purity higher than 98% and having a particle size distribution such that 75% by mass of the particles have a diameter greater than 30 µm, the median diameter by mass of this particle size fraction as measured by laser granulometry being less than 300 µm. The mixture also contains an organic binder of the type derived from cellulose. Water is added and the mixture kneaded until there is obtained a homogeneous paste the plasticity of which permits extrusion, the die being configured to obtain monoliths according to the invention, drying the raw monoliths using microwaves for long enough to reduce the content of water that is not chemically bound to less than 1% by mass, firing to a temperature of at least 1900° C. and below 2400° C., which temperature is typically sustained for at least 1 hour and preferably for at least 3 hours. The material obtained has an open porosity of 20 to 70%, preferably 40 to 50% by volume and a median pore diameter of the order of 10 nm to 50 micrometers, preferably 10 nm to 40 micrometers, more preferably, 20 to 30 micrometers.

The filter support is then coated with a membrane. The membrane may be applied using various techniques known to those skilled in the art: deposited from suspensions or slurries, chemical vapor deposition (CVD) or thermal spray deposition, for example plasma spraying. For preference, the membrane layers are applied by coating from slurries or from suspensions. The membrane may be obtained by applying several successive layers. The membrane generally comprises a first layer, referred to as the primer layer, applied in direct contact with the substrate. The primer acts as a key coat. The slurry used for applying the primer preferably contains between 30 and 100 wt % of grains of SiC having a median diameter of 1 to 30 µm, the complement being, for example, a powder of metallic silicon, silica and/or a carbon powder. To this mixture of powders is added a mass of deionized water that corresponds to 80 to 120% of the total mass of the powders. The membrane also comprises a separating layer applied to the primer layer. It is in this separating layer that the porosity is controlled in order to give the filter its selectivity. The slurry used for applying the separating layer may contain between 30 and 70 wt % of grains of SiC having a median diameter of 0.5 to 20 μm or between 30 and 70 wt %, in total, of a mixture of metallic silicon, silica and carbon, the complement being deionized water. Certain additives such as thickeners, binders and/or dispersants may be added to the slurries in order in particular to control their rheology. The viscosity of the slurries is typically from 0.01 to 0.8 Pa·s, preferably from 0.05 to 0.7 Pa·s, measured at 22° C. under a shear gradient of $1\ s^{-1}$ in accordance with standard DIN-53019-1:2008. The slurries may typically contain from 0.1 to 1% of the mass of water in thickeners preferably selected from cellulose derivatives. They may typically contain from 0.1 to 5% of the mass of SiC powder in binders preferably selected from poly(vinyl alcohol) (PVA) or and derivatives of acrylic. The slurries may also contain from 0.01 to 1% of the mass of SiC powder in dispersants preferably selected from polyammonium methacrylate. One or more layers of slurry may be applied in order to form the membrane. The application of a layer of slurry typically makes it possible to obtain a membrane with a thickness of 0.1 to 80 μm, but thicker membranes typically from 100 to 300 μm may be obtained by applying several successive layers of slurry.

The support thus coated is then dried at ambient temperature typically for at least 30 minutes and then at 60° C. for at least 24 hours. The supports thus dried are sintered at a firing temperature typically comprised between 1000 and 2200° C. in a non-oxidizing atmosphere, preferably under argon, so as to obtain a membrane porosity, measured by image analysis, of 10 to 70 vol % and a median equivalent pore diameter, measured by image analysis, of 10 nm to 5 μm.

The filtering structure according to the invention can be used for various applications to purifying liquids and/or separating particles or molecules of a liquid. The filtering structure according to the invention can be used for various applications to the purification of liquids according to the invention makes it possible to maximize the flow of filtrate independently of the viscosity of the liquid that is to be filtered. It can be used for filtering liquids which for example have a dynamic viscosity of 0.1 to 20 mPa·s, or even 50 mPa·s. The dynamic viscosity of the fluid that is to be filtered can be measured at 20° C., under a shear gradient of $1\ s^{-1}$ in accordance with standard DIN 53019-1:2008. The present invention in particular relates to the use of a filtering structure as described hereinabove for purifying the production water derived from the extraction of petroleum or gases from shale. It also finds an application in various industrial processes for the purification and/or separation of liquids in the chemical, pharmaceutical, foodstuffs or agrifoodstuffs industries or in bioreactors, and in swimming pool waters.

The attached figures illustrate certain aspects of the present invention in greater detail. The information given hereinafter must not, however, be considered as restricting the scope of the invention, in any of the aspects of the invention described in the figures.

Figure 1:
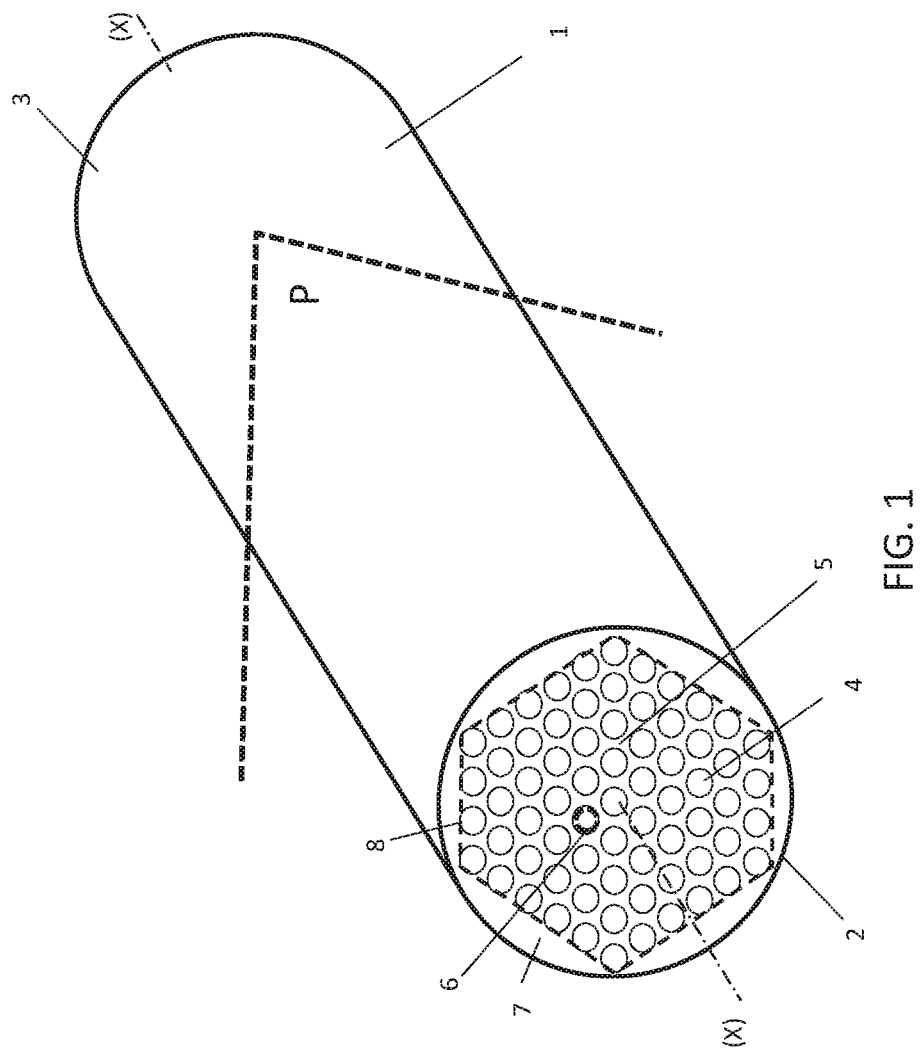
FIG. 1 illustrates an overall view of a common filter structure.

FIG. 1 illustrates a tangential filtration structure comprising a support 1 of cylindrical shape having a main axis (X), an upstream face 2 and a downstream face 3, according to the direction in which the liquid to be filtered circulates. A plurality of passages 4, parallel to the main axis (X) are formed in the internal part 8 of the support and separated from one another by porous internal walls 5. Peripheral walls 7 separate the passages situated in the internal part 8 of the support from the outside. The passages 4 are open on the upstream face and on the downstream face, in the direction in which the liquid to be filtered circulates. The passages 4 are covered on their internal surface by a membrane 6 (depicted in FIG. 1 on just one passage for greater clarity). In operation, the liquid is brought onto the downstream face and passes through the structure via the passages 4. According to the principles of tangential filtration, some of the liquid passes through the porous walls 5 of the structure 1 and is filtered via the membrane 6 applied to the walls. The filtered liquid (filtrate) is recovered at the periphery of the filter after having passed through the peripheral wall 7, via recuperating means known per se (and not depicted in FIG. 1), for example of the type of those described in publication WO2017/085551, and the liquid (retentate) remaining in the passages is removed on the upstream face of the structure, for example toward other filtering units of the same type.

Figure 2:
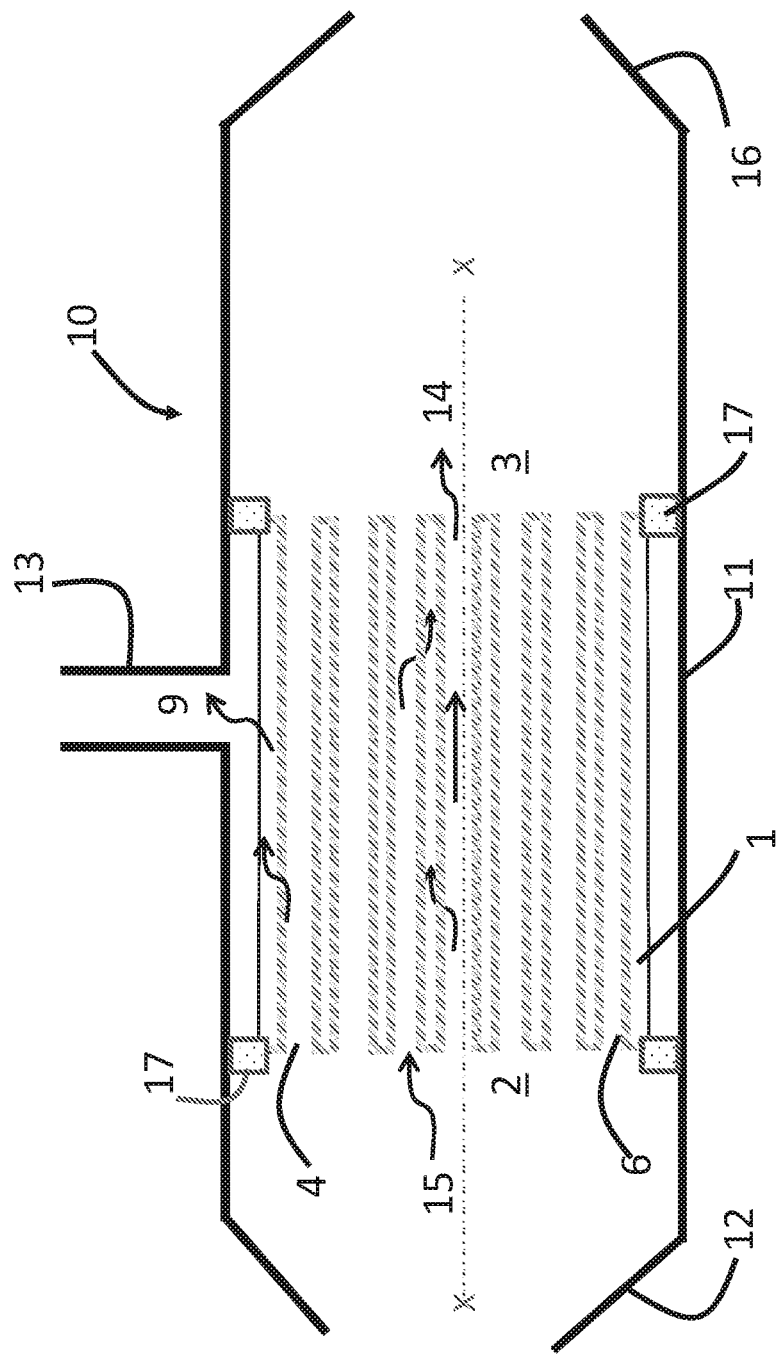
FIG. 2 is a view of the upstream face of a filter structure explaining how the parameters measured according to the invention are measured.

As a general rule, as depicted in FIG. 2, the filtering structure described hereinabove is inserted in a filtration device 10 comprising an enclosure 11 sealing around said filtering structure. The enclosure in particular comprises means 12 for introducing the liquid 15 that is to be filtered, in fluidic communication with the passages on the upstream face of said filter structure, means 13 for removing the permeate 9 at the periphery of the filter structure and in fluidic communication with the peripheral wall of said filter structure and means 16 for removing the retentate or concentrate 14 on the downstream face of said filter structure and seals 17 as illustrated in FIG. 2.

Figure 3:
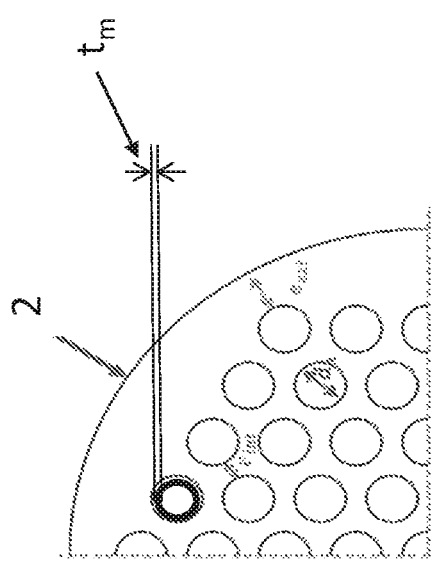
FIG. 3 is a frontal view of the upstream face of a filtration filter, the inlet and outlet passages of which are of round cross section.
Figure 5:
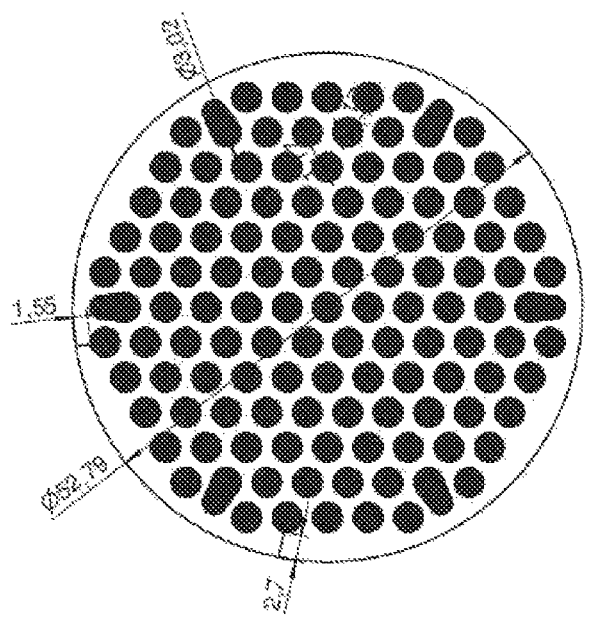
FIGS. 4 and 5 depict two complete configurations of the front face of a filter according to the present invention. In these figures, the dimensions are quoted in millimeters.
Figure 4:
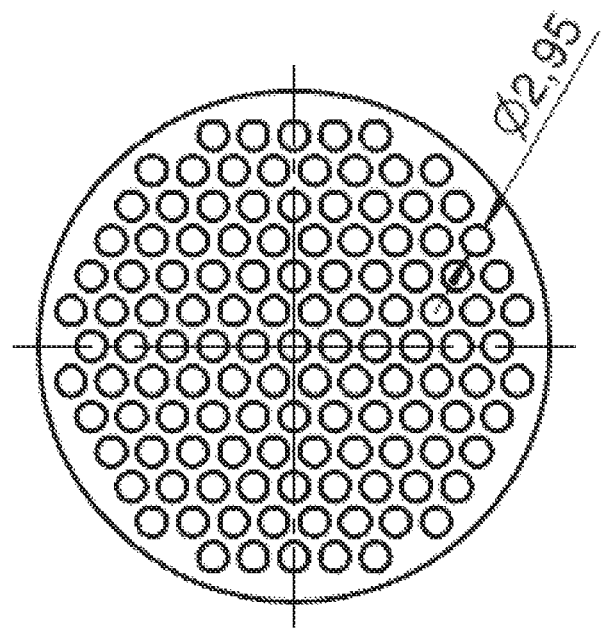

FIG. 3 is a frontal view of the upstream face of a filtration filter the inlet and outlet passages of which are of round cross section. FIG. 3 depicts the parameters $e_{int}$ (the minimum thickness of the internal walls between the passages), $e_{ext}$ (the minimum thickness of the peripheral wall of the filter), $t_m$ and $D_h$ described hereinabove.

The present invention is illustrated using the following nonlimiting examples, in conjunction with the appended FIGS. 1 to 5.

EXAMPLES

A—First Series of Examples

A first series of examples of structures according to the invention (example 1) and comparative structures (examples C11 to C16) were prepared according to the methods described hereinbelow.

Example 1 (Invention)

A support was produced according to techniques well known to those skilled in the art by forming a honeycomb of silicon carbide. In order to do that the following were blended in a mixer:

- 3000 g of a mixture of the two powders of particles of silicon carbide with a purity higher than 98% containing 75 wt % of a first powder of grains having a median diameter of around 60 µm and 25 wt % of a second powder of grains having a median diameter of around 2.0 µm; and
- 300 g of an organic binder of the cellulose derivative type.

Approximately 25 wt % of water with respect to the mass of SiC and of organic binder was added and the mixture mixed to form a homogeneous paste the plasticity of which allows extrusion in order to obtain a support exhibiting a porosity of 40%.

The support was extruded from this paste using a die in order to obtain a cylindrical raw monolithic block with a diameter of 51 mm and a length of 300 mm, the internal part of which had a plurality of passages of circular cross section. The shape of the die was suited to obtaining passages of circular cross section having a hydraulic diameter of 3 mm and internal walls with a minimum thickness of 1200 micrometers, according to FIG. 4.

The raw support obtained was then dried in order to bring the content of non-chemically bound water down to less than 1 wt %, and then fired under argon to a temperature of 2100° C. which was maintained for 5 hours. The support obtained had an open porosity of 40% and a median pore diameter of around 25 micrometers, as measured by mercury porosimetry.

A filtration membrane was then applied to the internal surface of the passages. The membrane was applied by slurry coating. To do that, a membrane-keying primer was formed first of all, from a slurry the mineral formulation of which contained 50 wt % of a powder of grains of black SiC with a median diameter D50 of around 20 microns and 50% deionized water.

A separating layer was then applied to the primer layer from a slurry containing 50 wt % of grains of SiC having a median diameter of around 1 µm and 50% deionized water. The viscosity of the slurries, measured at 22° C. under a shear gradient of 1 s$^{-1}$ in accordance with standard DINC33-53019-1:2008 was adjusted to 0.1 Pa·s using additives well known to those skilled in the art.

The primer and the membrane were applied using the same method. The slurry was introduced into a tank with stirring at 20 revolutions/min. After a phase of air removal under a slight vacuum, typically 25 mbar, with the stirring maintained, the reservoir was placed under a slight overpressure of around +1 bar so as to be able to coat the inside of the support from the bottom up to the top. This operation takes just a few seconds for a support of 300 mm in length. The slurry coats the internal wall of the passages of the filter element and the excess is then removed under gravity immediately after deposition.

The coated support was then dried at ambient temperature for 30 minutes and then at 60° C. for 30 h. The coated support thus dried was then sintered at at temperature of 1400° C. under an atmosphere of argon for 4 hours in order to obtain a membrane porosity of 40% with a median pore diameter of 250 nm.

The filter structure thus obtained had the characteristics reported in the attached Table 1. Its diameter $\varnothing_f$ satisfies relationship (1) according to the present invention.

Comparative Examples C11 and C12

Unlike the example according to the invention, the die was modified to obtain supports of smaller diameter to make up a multi-element filter with the same diameter $\varnothing_f$ as the filter according to example 1, all the other structural parameters remaining otherwise unchanged. Three units were assembled in accordance with the principles described in application WO2017/085551 to constitute the filter according to example C11, and four units were assembled in accordance with the principles described in application WO2017/085551 to constitute the filter according to example C12. The spacing between each unit in the assembled filter was equal to 3 mm.

Comparative Examples C13 and C14

The supports and membranes were produced in the way as for the example according to the invention. Unlike in example 1 according to the invention, the die was modified to obtain monolithic supports for examples C13 and C14 with diameters $\varnothing_f$ of 40 mm and 62 mm respectively, all the other structural parameters remaining unchanged. The diameters of these two structures are therefore outside, respectively below and above, the interval defined by application of formula (1) according to the invention.

Comparative Examples C15 and C16

The filters according to examples C15 and C16 had the same diameter as comparative example C14, but were made up by assembling, in accordance with the principles of application WO2017/085551, units in order to make up a multi-element filter with the same diameter $\varnothing_f$ as the monolithic filter structure according to C14, all the other structural parameters remaining otherwise unchanged with respect to that example. The spacing between each unit in the assembled filter was equal to 3 mm.

All of the data and results obtained for examples 1 and C11 to C16 are reported in table 1 below.

B—Second Series of Examples

According to this second series of examples, structures according to the invention (examples 2 and comparative structures (C21 to C26) were prepared using the same methods and the same principles as those described hereinbelow. In this second series of examples, the permeability of the support Ks of the support was varied.

Example 2 According to the Invention

In order to obtain another value for the permeability Ks, unlike in example 1, for this second series of examples the support was produced from a blend of two powders of particles of silicon carbide of a purity higher than 98% containing 70 wt % of a first powder of grains having a median diameter of around 11 µm and 30 wt % of a second powder of grains having a median diameter of around 0.5 µm.

The raw support obtained was then dried to bring the content of non-chemically bound water down to under 1 wt %, then fired under argon to a temperature of 2150° C., which was maintained for 5 hours. The support obtained had an open porosity of 40% and a median pore diameter of around 15 microns, as measured by mercury porosimetry.

Supports were thus obtained the permeability of which was lower than that measured in the first series of examples as reported in table 2. The same procedure as used for the example was then used to apply the same membrane associated with the same primer as with the structure according to example 1.

Comparative Examples C21 to C26

Examples C21 to C26 respectively correspond to examples C11 to C16, with the difference that supports of lower permeability, according to example 2, were used to form the filters in these examples.

All of the data and results obtained are reported in table 2 below.

Test and Results Table:

For each of these monolithic or multi-element filter structures, the ratio $\Phi/\Phi_{max}$ was determined, where $\Phi$ is the characteristic flow of the filter structure in question and $\Phi_{max}$ is the flow measured for the filter structure according to example 1 according to the invention for the first series of examples or according to example 2 according to the invention for the second series of examples, to which an effectiveness of 100% is assigned. The characteristic flow of a filter was evaluated using the following method: at a temperature of 25° C., a fluid made of demineralized water is fed to the filters that are to be evaluated at a trans-membrane pressure of 0.5 bar and a rate of flow along the passages of 2 m/s. The permeate is recovered at the periphery of the filter. The measurement of the characteristic flow of the filter is expressed in L/h/m/bar after 20 h of filtration. The results obtained, together with all the relevant dimensional characteristics of the filters thus obtained are summarized in table 1 below.

Interpretation of the Results:

Regarding the first series of examples (example 1 according to the invention and C11 to C16):

The multielement filters according to examples C11 and C12 have a filtration capability inferior to that of the monolithic structure according to example 1 according to the invention, as indicated by the ratio of the flows mentioned in table 1.

The monolithic filter structures according to example C13, the diameter of which is not in accordance with the invention, exhibit flows which are very much degraded by comparison with the reference structure.

Comparing examples C14 to C16 makes it possible to show that the monolithic filter structure selected according to the invention exhibits a flow and filtration capabilities that are optimal, taking account of the combined structural characteristics of the support and of the filter membrane. In particular, the flows measured according to the filters obtained by assembling several filter units (examples C15 and C16) appear to perform better than those for the monolithic structure of the same diameter (example C14). In such a circumstance, the multi-element filter appears to perform better, even though it is more complex to implement.

Example 2 shows that a lower support permeability Ks requires a lower diameter $\emptyset_f$ of the monolithic filter structure, by application of the present invention.

In the same way as for the first series of examples, it is found that it is possible, by applying the same formula (1) according to the invention, to optimize the diameter of the filter according to structural parameters both of the support and of the membrane.

The various filters described in applications WO2015/177476A1 (D1) and WO2016/097661 (D2), likewise filed by the present applicant company, were also studied. The results of the tests and calculations are reported in table 3 below. It may be seen that the value of the diameter of the structures described in these examples is not optimal and does not meet the criteria of the present invention as described in particular in the claims which follow.

TABLE 1

| Example | | Ex. 1 | C11 | C12 | C13 | C14 | C15 | C16 |
|---|---|---|---|---|---|---|---|---|
| Membrane $D_{50}$ | nm | 250 | 250 | 250 | 250 | 250 | 250 | 250 |
| Membrane AP | % | 40 | 40 | 40 | 40 | 40 | 40 | 40 |
| Km (×10$^{17}$) | m$^2$ | 6.2 | 6.2 | 6.2 | 6.2 | 6.2 | 6.2 | 6.2 |
| tm | μm | 50 | 50 | 50 | 50 | 50 | 50 | 50 |
| Support $D_{50}$ | μm | 25 | 25 | 25 | 25 | 25 | 25 | 25 |
| Support AP | % | 40 | 40 | 40 | 40 | 40 | 40 | 40 |
| Ks (×10$^{13}$) | m$^2$ | 6.2 | 6.2 | 6.2 | 6.2 | 6.2 | 6.2 | 6.2 |
| (Ks × tm)/Km | m | 0.5 | 0.5 | 0.5 | 0.5 | 0.5 | 0.5 | 0.5 |
| Dh | mm | 3 | 2 | 2 | 3 | 3 | 2 | 2 |
| $e_{int}$ | mm | 1.2 | 0.7 | 0.7 | 1.2 | 1.2 | 0.7 | 0.7 |
| $e_{ext}$ | mm | 1.5 | 1 | 1 | 1.5 | 1.5 | 1 | 1 |
| Filter type | — | monolithic | multi-element | multi-element | monolithic | monolith | multi-element | multi-element |
| Number of filters | — | 1 | 3 | 4 | 1 | 1 | 3 | 4 |
| Ø individual structure | mm | 51 | 22 | 19 | 40 | 62 | 27 | 24 |
| Ø filter | mm | 51 | 51 | 51 | 40 | 62 | 62 | 62 |
| Øf calculated according to relationship (1) | mm | 43-59 | — | — | 43-59 | 43-59 | — | — |
| $\Phi/\Phi$max | — | 1.00 | 0.92 | 0.92 | 0.60 | 1.37 | 1.41 | 1.47 |

TABLE 2

| Example | | Ex. 2 | C21 | C22 | C23 | C24 | C25 | C26 |
|---|---|---|---|---|---|---|---|---|
| Membrane $D_{50}$ | nm | 250 | 250 | 250 | 250 | 250 | 250 | 250 |
| Membrane AP | % | 40 | 40 | 40 | 40 | 40 | 40 | 40 |

TABLE 2-continued

| Example | | Ex. 2 | C21 | C22 | C23 | C24 | C25 | C26 |
|---|---|---|---|---|---|---|---|---|
| $K_m$ (×$10^{17}$) | $m^2$ | 6.2 | 6.2 | 6.2 | 6.2 | 6.2 | 6.2 | 6.2 |
| $t_m$ | μm | 50 | 50 | 50 | 50 | 50 | 50 | 50 |
| Support $D_{50}$ | μm | 15 | 15 | 15 | 15 | 15 | 15 | 15 |
| Suppor AP | % | 40 | 40 | 40 | 40 | 40 | 40 | 40 |
| $K_s$ (×$10^{13}$) | $m^2$ | 2.2 | 2.2 | 2.2 | 2.2 | 2.2 | 2.2 | 2.2 |
| ($K_s$ × $t_m$)/$K_m$ | m | 0.18 | 0.18 | 0.18 | 0.18 | 0.18 | 0.18 | 0.18 |
| Dh | mm | 3 | 2 | 2 | 3 | 3 | 2 | 2 |
| $e_{int}$ | mm | 1.2 | 0.7 | 0.7 | 1.2 | 1.2 | 0.7 | 0.7 |
| $e_{ext}$ | mm | 1.5 | 1 | 1 | 1.5 | 1.5 | 1 | 1 |
| Filter type | — | monolith | multi-element | multi-element | monolith | monolith | multi-element | multi-element |
| Number of filters | — | 1 | 3 | 4 | 1 | 1 | 3 | 4 |
| Ø individual structure | mm | 43 | 18 | 16 | 33 | 51 | 22 | 19 |
| Ø filter | mm | 43 | 43 | 43 | 33 | 51 | 51 | 51 |
| Øf calculated according to relationship (1) | mm | 36-48 | — | — | 36-48 | 36-48 | — | — |
| Φ/Φmax | — | | 1.00 | 1.00 | 1.00 | 0.57 | 1.34 | 1.45 | 1.53 |

TABLE 3

| Example | | ex 1 (D1) | ex 2 (D1) | ex 3 (D1) | ex 4 (D1) | ex 1 (D2) | ex 2 (D2) | ex 3 (D2) | ex 4 (D2) | ex 5 (D2) | ex 6 (D2) |
|---|---|---|---|---|---|---|---|---|---|---|---|
| disclosed monolith Ø | mm | 25 | 25 | 25 | 25 | 25 | 25 | 25 | 25 | 25 | 25 |
| optimal Ø according to the invention | mm | 35 | 35 | 35 | 33 | 48 | 30 | 46 | 75 | 48 | 81 |
| Ø max according to the invention | mm | 40 | 40 | 40 | 38 | 56 | 35 | 53 | 86 | 56 | 94 |
| Ø min according to the invention | mm | 30 | 29 | 30 | 28 | 41 | 26 | 39 | 64 | 41 | 69 |

The invention claimed is:

1. A monolithic membrane-type filtration structure for filtering liquids, comprising:
    a support formed of a porous inorganic material of permeability $K_s$, said support having a tubular overall shape with a main axis, an upstream base, a downstream base, a peripheral wall delimiting an internal part;
    a plurality of passages parallel to the main axis of the support, formed in the internal part of the support, said passages being separated from one another by internal walls formed of the porous inorganic material;
    all said passages being open at their upstream or downstream ends in a direction in which said liquid circulates,
    the filtered liquid being removed via said peripheral wall,
    a membrane of permeability $K_m$ and of mean thickness $t_m$ covering the internal surface of the passages;
wherein an external hydraulic diameter of the monolithic membrane-type filtration structure $Ø_f$ satisfies the relationship (1):

$$Ø_f = \alpha \times [A + B \times \log_{10}(K_s \times t_m / K_m)] \quad (1)$$

in which α is a coefficient comprised between 0.85 and 1.15, and $$A = -21570 \times e_{int}^2 - 18.6 \times D_h + 19.0 \times e_{int} - 2.5 \times e_{ext} + 0.1244$$

$$B = -11760 \times D_h \times e_{int} + 9.7 \times e_{int} + 3.1 \times e_{ext} + 0.04517$$

in which:
$D_h$ is the mean hydraulic diameter of the passages,
$e_{int}$ is the minimum thickness of the internal walls between the passages and $e_{int}$ is from 0.3 mm to 3 mm,
$e_{ext}$ is the minimum thickness of the peripheral wall of the filter and $e_{ext}$ is from 0.5 mm to 4 mm, $t_m$, $Ø_f$, $e_{int}$, $e_{ext}$ and $D_h$ being expressed in meters and $K_s$ and $K_m$ being expressed in $m^2$, and
wherein the external hydraulic diameter $Ø_f$ of the support is from 30 mm to 100 mm.

2. The filtration structure as claimed in claim 1, wherein the ratio $K_s \times t_m / K_m$ is from 0.01 m to 10 m.

3. The filtration structure as claimed in claim 1, wherein the mean hydraulic diameter of the passages $d_h$ is from 0.5 to 7 mm.

4. The filtration structure as claimed in claim 1, wherein the support has square, hexagonal or circular bases.

5. The filtration structure as claimed in claim 1, wherein all the passages have the same hydraulic diameter.

6. The filtration structure as claimed in claim 1, wherein at least two passages have a different hydraulic diameter.

7. The filtration structure as claimed in claim 1, wherein the permeability $K_s$ of the support is from $1.0 \times 10^{-14}$ to $1.0 \times 10^{-11}$.

8. The filtration structure as claimed in claim 1, wherein the permeability $K_m$ of the membrane is from $1.0 \times 10^{-19}$ to $1.0 \times 10^{-14}$.

9. The filtration structure as claimed in claim 1, wherein the mean thickness of the membrane $t_m$ is from 0.1 to 300 μm.

10. The filtration structure as claimed in claim 1, wherein the membrane has an open porosity from 10 to 70%.

11. The filtration structure as claimed in claim 1, wherein the median diameter of the pores of the support is from 20 to 50 micrometers.

12. The filtration structure as claimed in claim 1, wherein the passages are of circular or polygonal cross section.

13. A filtration device comprising:
   said filter structure as claimed in claim 1, and
   an enclosure sealing around said filter structure, said enclosure comprising:
      means for introducing the liquid that is to be filtered, in fluidic communication with the passages on the upstream face of said filter structure,
      means for removing the permeate at the periphery of the filter structure and in fluidic communication with the peripheral wall of said filter structure,
      means for removing the retentate or concentrate on the downstream face of said filter structure.

14. A method comprising purifying and/or separating liquids in the chemical, pharmaceutical, food or agrifoodstuffs industry, in bioreactors, or in the extraction of oil or gases from shale with a filter structure as claimed in claim 1.

15. The filtration structure as claimed in claim 3, wherein the external hydraulic diameter $\emptyset_f$ of the support is from 50 to 80 mm.

16. The filtration structure as claimed in claim 3, wherein the mean hydraulic diameter of the passages $d_h$ is from 1.5 to 3.5 mm.

17. The filtration structure as claimed in claim 1, wherein the minimum thickness $e_{ext}$ of the peripheral wall of the filter is from 1 to 2 mm.

* * * * *